(12) United States Patent
Tiana

(10) Patent No.: US 10,358,233 B1
(45) Date of Patent: Jul. 23, 2019

(54) SYSTEMS AND METHODS FOR IMPROVED RUNWAY AND ROADWAY BRAKING

(71) Applicant: Rockwell Collins, Inc., Cedar Rapids, IA (US)

(72) Inventor: Carlo L. Tiana, Portland, OR (US)

(73) Assignee: ROCKWELL COLLINS, INC., Cedar Rapids, IA (US)

(*) Notice: Subject to any disclaimer, the term of this patent is extended or adjusted under 35 U.S.C. 154(b) by 304 days.

(21) Appl. No.: 15/253,638

(22) Filed: Aug. 31, 2016

(51) Int. Cl.
| | |
|---|---|
| *B64D 45/04* | (2006.01) |
| *B64D 45/08* | (2006.01) |
| *B64C 25/42* | (2006.01) |
| *B64D 47/08* | (2006.01) |
| *B64D 33/04* | (2006.01) |
| *G02B 27/01* | (2006.01) |

(52) U.S. Cl.
CPC ............ *B64D 45/08* (2013.01); *B64C 25/426* (2013.01); *B64D 33/04* (2013.01); *B64D 45/04* (2013.01); *B64D 47/08* (2013.01); *G02B 27/0101* (2013.01); *G02B 27/0179* (2013.01); *G02B 2027/0138* (2013.01); *G02B 2027/0183* (2013.01)

(58) Field of Classification Search
CPC ........ B64D 45/08; B64D 33/04; B64D 47/08; G02B 27/0101; G02B 27/0179; G02B 2027/0138; G02B 2027/0183; B64C 25/426

See application file for complete search history.

(56) References Cited

U.S. PATENT DOCUMENTS

| | | | |
|---|---|---|---|
| 9,663,223 B1* | 5/2017 | Harrison | B64C 25/426 |
| 2014/0012437 A1* | 1/2014 | Jones | B60T 8/1703 701/15 |
| 2015/0012201 A1* | 1/2015 | Metzger | B60T 8/1703 701/82 |
| 2016/0069743 A1* | 3/2016 | McQuilkin | G01J 3/2803 356/416 |

OTHER PUBLICATIONS

Pascucci et al., "Road Asphalt Pavements Analyzed by Airborne Thermal Remote Sensing", Sensors, 2008, 8, pp. 1278-1296, ISSN 1424-8220.

* cited by examiner

*Primary Examiner* — Genna M Mott
(74) *Attorney, Agent, or Firm* — Donna P. Suchy; Daniel M. Barbieri

(57) ABSTRACT

A system includes a sensor configured to be located on an exterior of a vehicle, a processing circuit, and a display device. The sensor is configured to detect a surface condition of a surface and output an indication of the surface condition. The processing circuit is configured to receive the indication from the sensor and generate a visualization based on the indication. The display device is configured to display the visualization.

16 Claims, 8 Drawing Sheets

SYSTEMS AND METHODS FOR IMPROVED RUNWAY AND ROADWAY BRAKING

BACKGROUND

The inventive concepts disclosed herein relate generally to the field of vehicle braking systems. More particularly, embodiments of the inventive concepts disclosed herein relate to braking systems based on detecting runway surface conditions for an airborne platform or ground platform.

An aircraft may receive an indication of runway conditions from generic air traffic reports, but these indications may be limited to overall runway condition or contamination forecasts, such as by stating that the runway is wet. A view of the runway through a cockpit of the aircraft may be obstructed or otherwise have low visibility, such as due to weather conditions, making it difficult for an operator of the aircraft to determine a safe landing and braking strategy.

SUMMARY

In one aspect, the inventive concepts disclosed herein are directed to a system including a sensor configured to be located on an exterior of a vehicle, a processing circuit, and a display device. The sensor is configured to detect a surface condition of a surface and output an indication of the surface condition. The processing circuit is configured to receive the indication from the sensor and generate a visualization based on the indication. The display device is configured to display the visualization.

In a further aspect, the inventive concepts disclosed herein are directed to a system including a sensor configured to be located on an exterior of an airborne platform, and a processing circuit. The sensor is configured to detect a surface condition of a surface and output an indication of the surface condition. The processing circuit is configured to receive the indication from the sensor, determine an expected braking traction for the surface based on the surface condition, and control operation of at least one of a brake or a reverse thruster of the airborne platform based on the expected braking traction.

In a further aspect, the inventive concepts disclosed herein are directed to a method. The method includes detecting a surface condition of a surface by a sensor, outputting an indication of the surface condition, generating a visualization based on the indication, and displaying the visualization.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
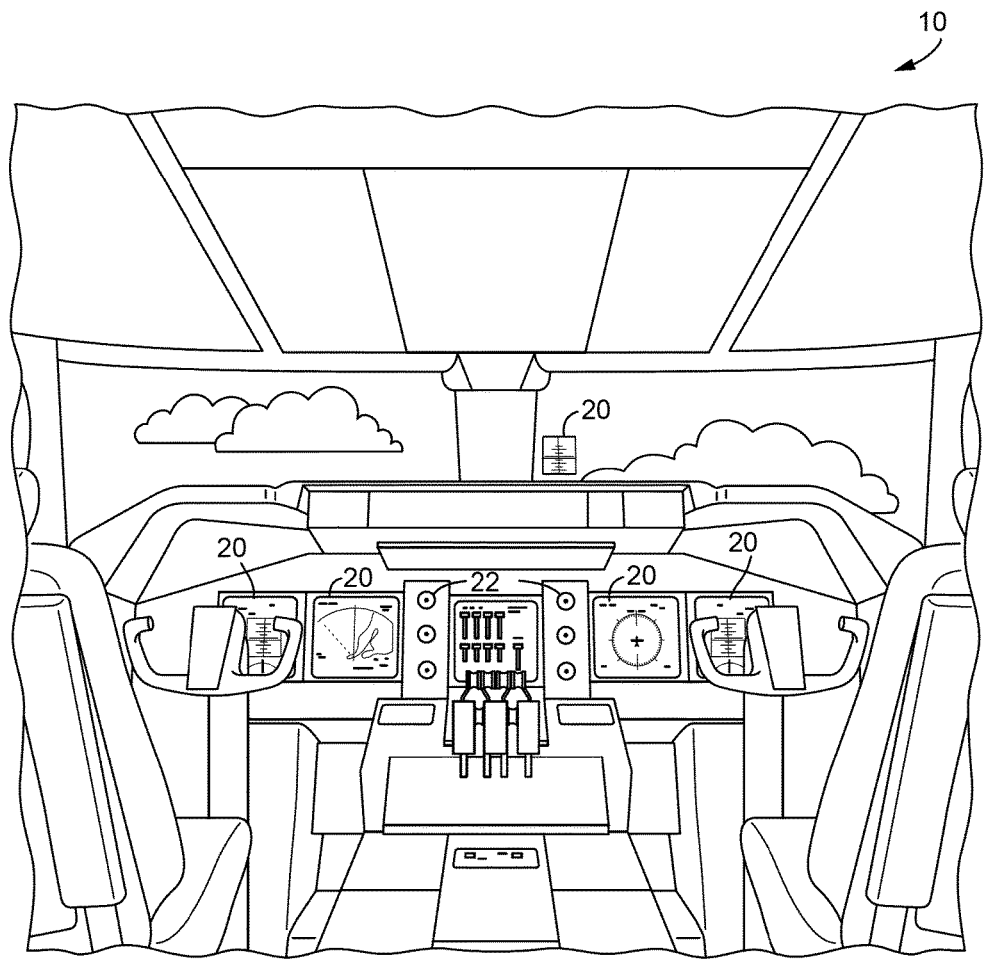
FIG. 1A is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for improved runway braking, including contaminated runway surface detection for improved braking efficiency. The inventive concepts disclosed herein can be utilized in a number of display devices and systems for airborne platforms (e.g., aircraft), including but not limited to flight control and autopilot systems, navigation systems, and flight display systems. While the present disclosure describes systems and methods implementable for an airborne platform, the inventive concepts disclosed herein may be used in any type of environment (e.g., in another aircraft, a spacecraft, a remotely-operated vehicle, a ground-based vehicle, automobile, or other moving platform, or in a non-vehicle application such as a ground-based display system, an air traffic control system, a radar system, a virtual display system).

In some embodiments, a system includes a sensor configured to be located on an exterior of a vehicle and a processing circuit. The sensor is configured to detect a surface condition of a surface and output an indication of the surface condition. The vehicle can be an airborne platform that includes at least one of a brake or a reverse thruster, and the processing circuit can be configured to determine an expected braking traction based on the indication and control operation of the at least one of the brake or thruster based on the indication. The system can include a display device, and the processing circuit can be configured to generate a visualization based on the indication, and the display device can be configured to display the visualization. Systems manufactured in accordance with the inventive concepts described herein can improve operation of vehicles (e.g., ground platforms, airborne platforms) by showing an operator of the vehicle who has low visibility how certain regions of a surface for landing or takeoff may have poor braking conditions, such as relatively low traction, and can also include a feedback control system that controls brakes and/or thrusters to facilitate safe maneuvering of the vehicle.

Referring to FIG. 1A, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UP") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® or other head-worn display systems. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to provide a rendered display from the systems and methods of the inventive concepts disclosed herein.

In some embodiments, the flight displays 20 may provide an output based on data received from a system external to an aircraft, such as a ground-based weather radar system, satellite-based system, a sensor system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft. The flight displays 20 may receive image information, such as a visualization generated based on an indication of a runway surface condition, and display the image information.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 1B:
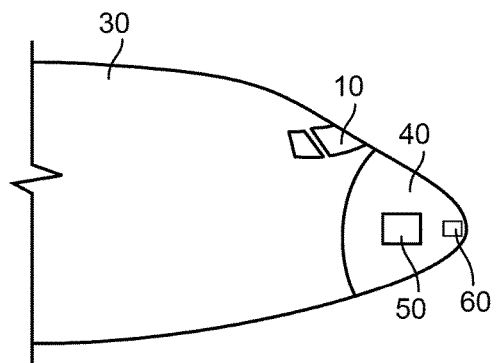
FIG. 1B is a schematic illustration of an exemplary embodiment of an aircraft according to the inventive concepts described herein.

Referring now to FIG. 1B, an aircraft 30 (e.g., an airborne platform) is shown according to an exemplary embodiment of the inventive concepts disclosed herein. The aircraft 30 includes a nose 40, a radar system 50, and the aircraft control center or cockpit 10.

In some embodiments, the aircraft 30 includes a sensor 60. The sensor 60 can be located (e.g., positioned, mounted, attached) on an exterior of the aircraft 30. The sensor 60 can be configured to acquire information regarding an environment surrounding the aircraft 60. For example, the sensor 60 can sense, receive, or detect light (e.g., electromagnetic radiation) from the environment, and process, manipulate, or otherwise transform the light into an output signal indicative of the light (e.g., an output signal including image information corresponding to the detected light). The sensor 60 can detect light within a field of view (e.g., view angle) that may be defined by a lens or other device of the sensor 60 configured to detect light. In some embodiments, the sensor 60 is included as part of or is communicatively coupled to an enhanced vision system (EVS) that also includes a display device in the aircraft control center 10 for displaying information (e.g., navigation information, runway information, or guidance information that may be displayed as an overlay on images received from the sensor 60).

In some embodiments, the sensor 60 is located on the nose 40 of the aircraft 30. By locating the sensor 60 on the nose 40, the sensor 60 can detect light from the environment in front of the aircraft 30. The sensor 60 may have a field of view that includes a portion of the environment below the aircraft 30 (e.g., a portion of the environment between a plane parallel to a direction of travel of the aircraft 30 and a ground surface and passing through at least part of the aircraft 30), which can allow the sensor 60 to detect light from a ground surface below the aircraft 30 (e.g., a ground runway, an aircraft carrier runway, or other takeoff or landing surface).

The sensor 60 can be an infrared sensor, such as a long-wave infrared sensor or camera. The sensor 60 can be configured to detect a wide band of the infrared spectrum (e.g., greater than or equal to 7 μm and less than or equal to 13 μm). The sensor 60 can be configured to detect multiple wavelengths or wavelength ranges (e.g., detect at 8 μm and detect at 12 μm). The sensor 60 can include an optical filter device configured to filter the received light into one or more wavelengths or wavelength ranges (e.g., receive light of a wavelength range of approximately 7 μm to 13 μm and pass light of 8 μm or 12 μm). In some embodiments, an output signal from the sensor 60 indicates a value of a temperature-emissivity product of a material in the environment from which the light detected by the sensor 60 is received (e.g., an emissivity of the material may be commingled with a temperature value detected by the sensor 60. The temperature-emissivity product values may be compared to facilitate identification or detection of the material, such as for identifying or detecting a material (or surface condition) on a ground surface. For example, a first sensor data may be detected at a first wavelength, a second sensor data may be detected at a second wavelength, and the sensor data may be compared (e.g., subtracted) to determine a sensor data difference. The sensor data difference can be compared to known sensor data difference values associated with specific materials to determine the detected material.

Table 1 provides an example of detection values for water, snow, frost, and asphalt. As indicated by Table 1, temperature-emissivity products detected by the sensor 60 can vary as a function of detection wavelength and as a function of material. By determining a sensor data difference delta Te between sensor data detected at different wavelengths, the sensor data difference can be correlated to known sensor data difference values for particular materials to identify or detect the material detected by the sensor 60. For example, as shown in Table 1, if the sensor 60 detects first sensor data having a value of 268.086 at a wavelength of 8 μm, and detects second sensor data having a value of 269.451 at a wavelength of 12 μm, the sensor data difference is determined to be −1.4, and can be correlated to the expected sensor data difference of −1.4 for water to determine that the material is water.

TABLE 1

Example mappings of sensor data and emissivities to materials

| Emissivity | Material Water | Snow | Frost | Asphalt |
| --- | --- | --- | --- | --- |
| e (8 μm) | 0.982 | 0.991 | 0.975 | 0.93 |
| e (12 μm) | 0.987 | 0.979 | 0.991 | 0.97 |
| 273K ambient, 8 μm | 268.086 | 270.543 | 266.175 | 253.89 |
| 237K ambient, 12 μm | 269.451 | 267.267 | 270.543 | 264.81 |
| delta Te | −1.4 | 3.3 | −4.4 | −10.9 |

Figure 2A:
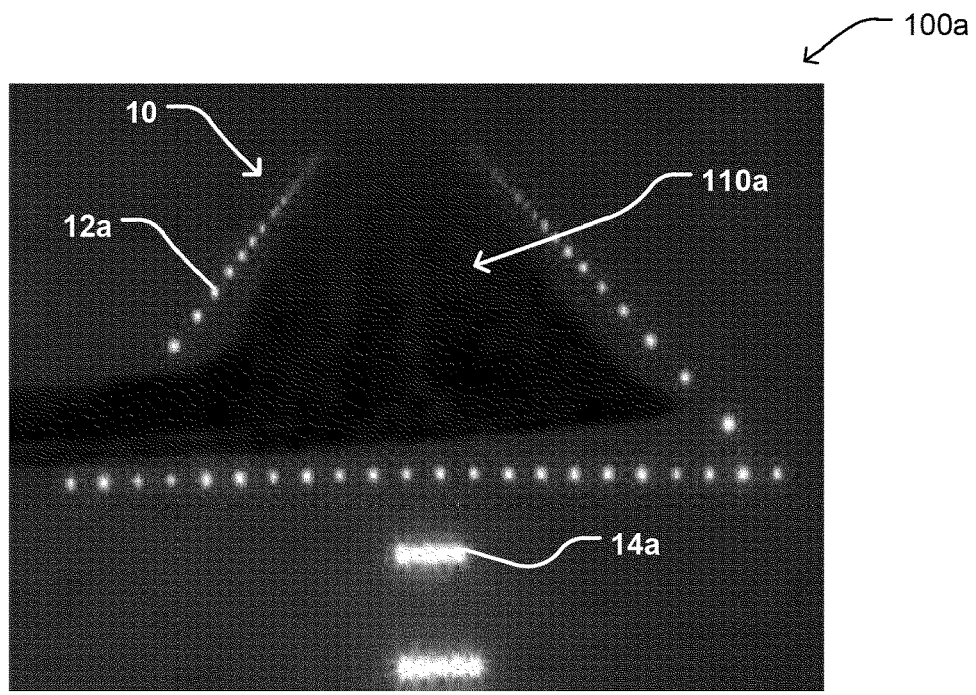
FIG. 2A is a schematic illustration of an exemplary embodiment of a displayed output at a first wavelength from a sensor according to the inventive concepts disclosed herein.
Figure 2B:
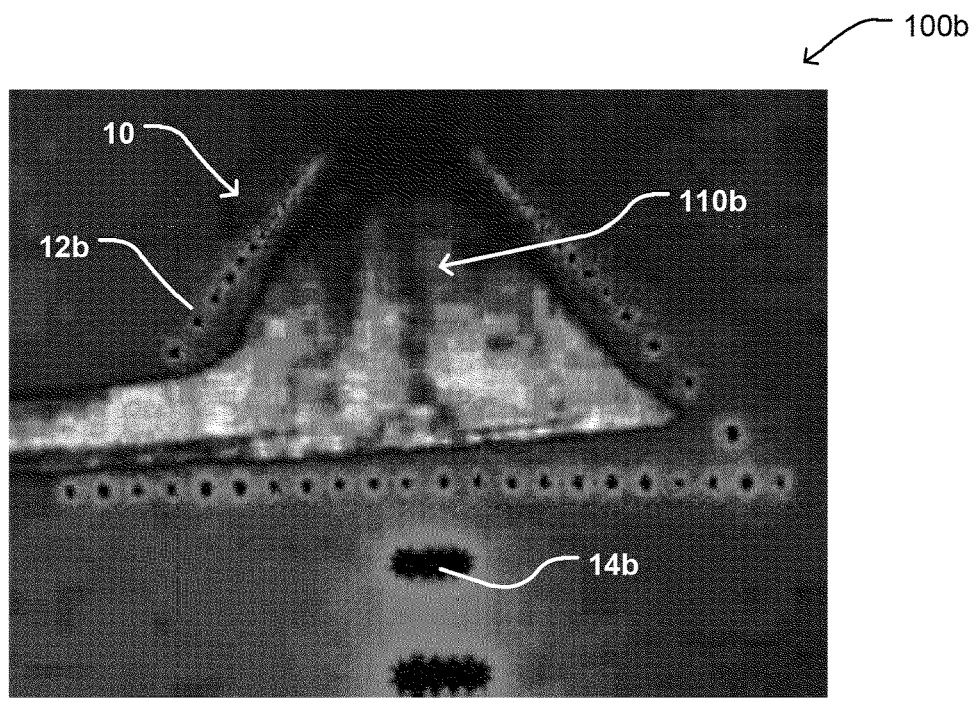
FIG. 2B is a schematic illustration of an exemplary embodiment of a displayed output at a second wavelength from the sensor of FIG. 2A according to the inventive concepts disclosed herein.

Referring now to FIGS. 2A-2B, exemplary embodiments of displayed outputs of a sensor (e.g., sensor 60 as described with reference to FIG. 1B) configured to detect a surface condition of a ground surface (e.g., a runway) are illustrated according to the inventive concepts disclosed herein. As shown in FIG. 2A, a display output 100a is shown based on the sensor 60 detecting light at a first wavelength (or band of wavelengths). For example, the first wavelength may be 8 μm. The field of view detected by the sensor 60 includes a runway 10 having runway indicators 12a, 14a (e.g., illuminated indicators, runway lights, or other devices used to delineate borders of the runway 10 and/or provide visual guidance information regarding the runway 10, and from which light can be received at the first wavelength). As shown in FIG. 2A for the first wavelength, the runway indicators 12a, 14a can have a bright white appearance (though various other appearances can be possible depending on factors including the material from which light is received and the wavelength at which the sensor 60 detects light).

The runway 10 is covered by a surface material that is detected (e.g., is visible) at the first wavelength as a first detected material output 110a. As shown in FIG. 2A for the first wavelength, the first detected material output 110a can have a dark or black appearance.

As shown in FIG. 2B, a display output 100b is shown based on the sensor 60 detecting light at a second wavelength (or a second band of wavelengths that does not overlap with the first band of wavelengths). For example, the second wavelength may be 12 μm. The field of view detected by the sensor 60 includes the runway 10. In FIG. 2B, the runway indicators 12b, 14b are shown to have an appearance different than analogous runway indicators 12a, 14a of FIG. 2A, due to being detected at a different wavelength (e.g., indicators 12a, 14a are shown to be dark or black with a gray or white outline). In addition, the surface material covering the runway 10 is detected at the second wavelength as second detected material output 110b, having (at least in some places) a relatively bright, white, or gray appearance (as compared to the first detected material output 110a).

Figure 2C:
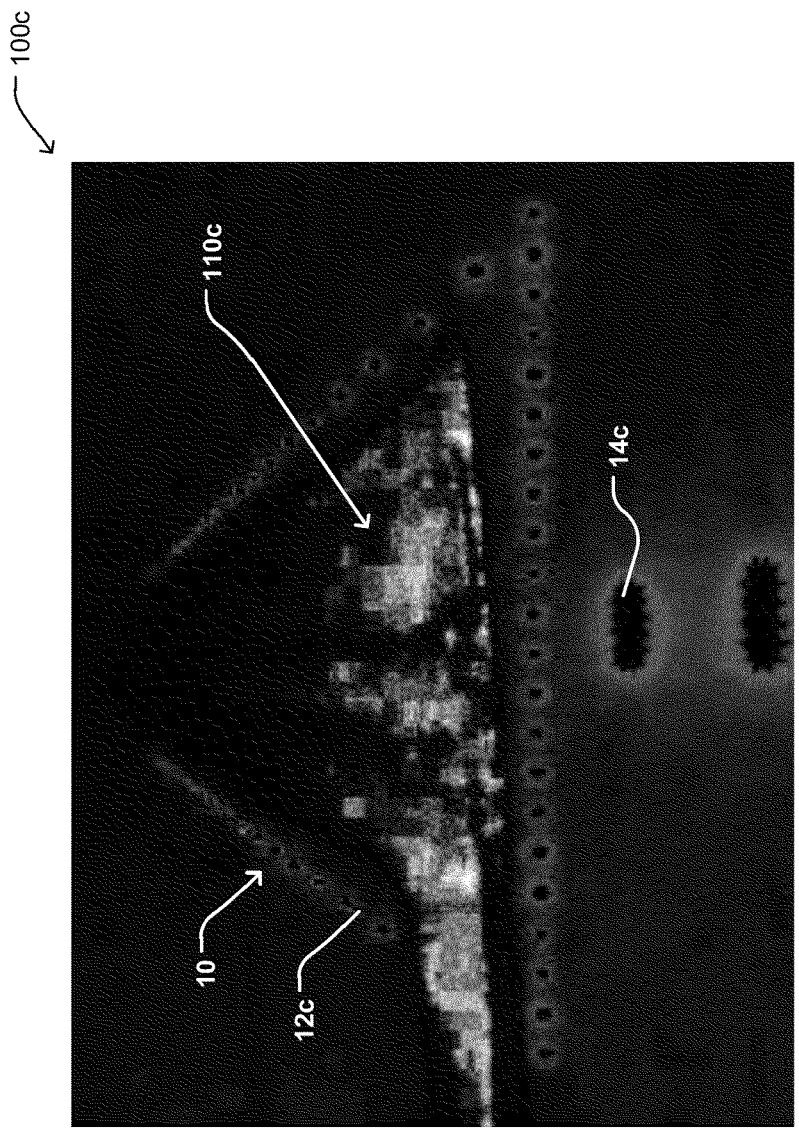
FIG. 2C is a schematic illustration of an exemplary embodiment of a comparison of the displayed outputs of FIGS. 2A and 2B according to the inventive concepts disclosed herein.

Referring now to FIG. 2C, an exemplary embodiment of a displayed output of the sensor 60 when the output at different wavelengths is compared is illustrated according to the inventive concepts disclosed herein. In FIG. 2C, a display output 100c corresponds to an output showing light detected by the sensor 60 at two different wavelengths (e.g., the first wavelength described with reference to FIG. 2A and the second wavelength described with reference to FIG. 2B) being compared, such as by subtracting a first sensor data from a second sensor data. For example, if the first sensor data includes a plurality of first sensor output values (e.g., temperature-emissivity values) arranged in space (e.g., arranged as pixels), and the second sensor data includes a plurality of second sensor output values arranged in space, each of the plurality of first sensor output values can be subtracted from the corresponding each of the plurality of second sensor output values (or vice versa) to determine a plurality of third sensor output values that can be used to generate a sensor output used to detect, determine, or identify materials on a ground surface. For example, runway indicators 12c, 14c can correspond to third sensor output values determined by comparing the sensor output values of runway indicators 12a, 14a to runway indicators 12b, 14c. The third detected material output 110c (which can be displayed to an operator of the aircraft 30) can correspond to third sensor output values determined by comparing the sensor output values of first detected material output 110a to second detected material output 110b. By comparing first detected material output 110a to second detected material output 110b, the material causing the detected material outputs can be identified and visually mapped to portions of the runway 10. For example, as shown in FIG. 2C, the material can be visible as relatively bright areas that may represent ice (e.g., a dangerous ice patch for which braking effectiveness may be relatively low) and relatively dark areas that can represent surface conditions where braking effectiveness is nominal. The third detected material output 110c may be displayed to an operator of the aircraft 30 in a manner as shown in FIG. 2C, such that the operator can visually identify the materials on the surface of the runway 10. The third detected material output 110 may also be processed to generate an output indicating or relating to braking effectiveness (e.g., the plurality of third sensor values can be individually or group-wise compared to expected sensor values for one or more materials to identify or detect the material corresponding to the third sensor values, and the detected materials can be mapped to brake effectiveness values which are compared to threshold brake effectiveness values to provide an output to the operator as to the brake effectiveness, e.g. as described further herein).

Figure 3A:
FIG. 3A is a schematic illustration of an exemplary embodiment of a visualization of a surface condition according to the inventive concepts described herein.

Referring now to FIG. 3A a schematic diagram of an exemplary embodiment of a visualization 200 is illustrated in accordance with the inventive concepts described herein. The visualization can be generated based on sensor data acquired from a sensor manufactured and operated in accordance with the inventive concepts described herein (e.g., sensor 60). The visualization can be generated and/or displayed using an EVS (e.g., displayed by EVS visual output that includes or is overlaid on visible light information received via a visible light sensor or a cockpit window or other transparent screen allowing visible light to be viewed from the environment), a HUD, a head-up guidance system (HGS), or a head-down display.

The visualization 200 can display, show, or be overlaid on a runway 210 or an image or video thereof. The visualization 200 can include graphical information 220 that may correspond to guidance information or navigation information for an airborne platform (e.g., aircraft 30). The graphical information 220 may include a remaining runway indicator.

In some embodiments, the visualization 200 includes a braking effectiveness indicator 230. The braking effectiveness indicator 230 may display information regarding braking effectiveness (e.g., braking traction, friction, slippage) for the airborne platform if it were to brake on the ground surface corresponding to the braking effectiveness indicator 230.

Figure 3B:
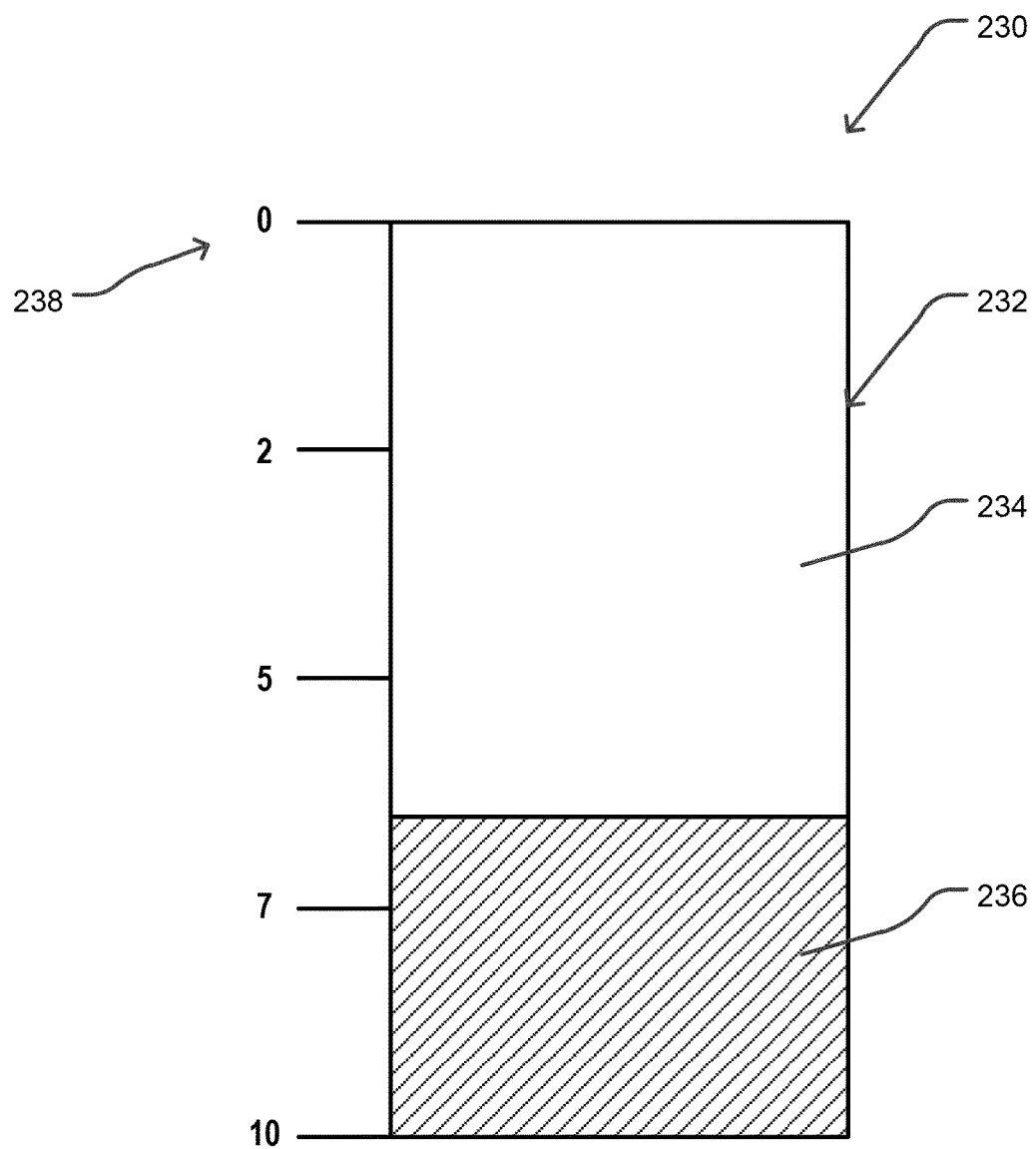
FIG. 3B is a schematic illustration of an exemplary embodiment of a surface braking indicator according to the inventive concepts described herein.

Referring further to FIG. 3A and now to FIG. 3B, a schematic diagram of an exemplary embodiment of the braking effectiveness indicator 230 of FIG. 3A is shown in further detail in accordance with the inventive concepts described herein. The braking effectiveness indicator 230 can include a runway map 232, such as the runway map 232 which indicates a remaining distance along the runway 210 from a location of the airborne platform to an end of the runway 210. The braking effectiveness indicator 230 can include runway distance markers 238 that indicate relative distance to the end of the runway 210 (the runway distance markers 238 may instead indicate absolute distance to the end of the runway 210), where "0" indicates the end of the runway 210 and "10" indicates the current location of the airborne platform. Scales of other magnitudes may also be used (e.g., a 0-1 scale, a 0-5 scale, a 0-100 scale, or a scale similar to those used along runways or in other runway-remaining indicator displays).

The runway map 232 includes a first portion 234 indicating nominal braking traction (e.g., sufficient for performing a braking maneuver or a landing maneuver that requires braking relative to (e.g., greater than) a braking traction threshold or a braking effectiveness threshold), and a second portion 236 indicating a low, poor, suboptimal, or subnominal braking traction (e.g., not sufficient for performing a braking maneuver relative to (e.g., less than, less than or equal to) a braking traction threshold or a braking effectiveness threshold). The runway map 232 can thus indicate to a viewer that the second portion 236 of the runway 210 should not be used to performing a braking maneuver or a landing maneuver that requires braking. In some embodiments, as the airborne platform travels relative to the runway 210, the braking effectiveness indicator 230 is updated. For example, as the field of view of the sensor 60 acquires new sensor data from the runway 210 due to motion of the airborne platform, the visualization 200 can be updated to reflect the new sensor data (e.g., as the airborne platform travels closer to or further from material having low braking traction, or closer to the end of the runway 210, the braking effectiveness indicator 230 can be updated based on the new sensor data and the new relative location of the end of the runway 210).

While FIG. 3B illustrates the first portion 234 as a blank space and the second portion 236 as a hatched space, various other visual indications (e.g., colors, shading, patterns) can be used to distinguish nominal braking traction regions from low braking traction regions of the runway 210 when visualized as part of the runway map 232. The braking traction indicator 230 can help a viewer control operation of the airborne platform by indicating where it may be unsafe, difficult, or dangerous to perform a landing or braking maneuver.

Referring back to FIG. 3A, in some embodiments, the visualization 200 includes runway surface condition indicators 240. The runway surface condition indicators 240 can be graphical elements mapping sensor data indicative of a surface condition (or the material causing the surface condition) to the runway 210. For example, sensor data representing the material or surface condition on the runway surface 210 can be mapped to spatial information (e.g., arranged in a pixel grid) for use when generating the visualization 200. The graphical elements of the runway surface condition indicators 240 can represent low braking traction regions of the runway 210 in a manner analogous to the second portion of the runway map 232. While FIG. 3A shows the graphical elements as being angled lines across the runway 210 (e.g., to indicate that the corresponding regions of the runway 210 have low braking traction), various other graphical elements can be used to distinguish low braking traction regions from nominal braking traction regions. The runway surface condition indicators 240 can help a viewer control operation of the airborne platform by indicating where it may be unsafe, difficult, or dangerous to perform a landing or braking maneuver.

Figure 4:
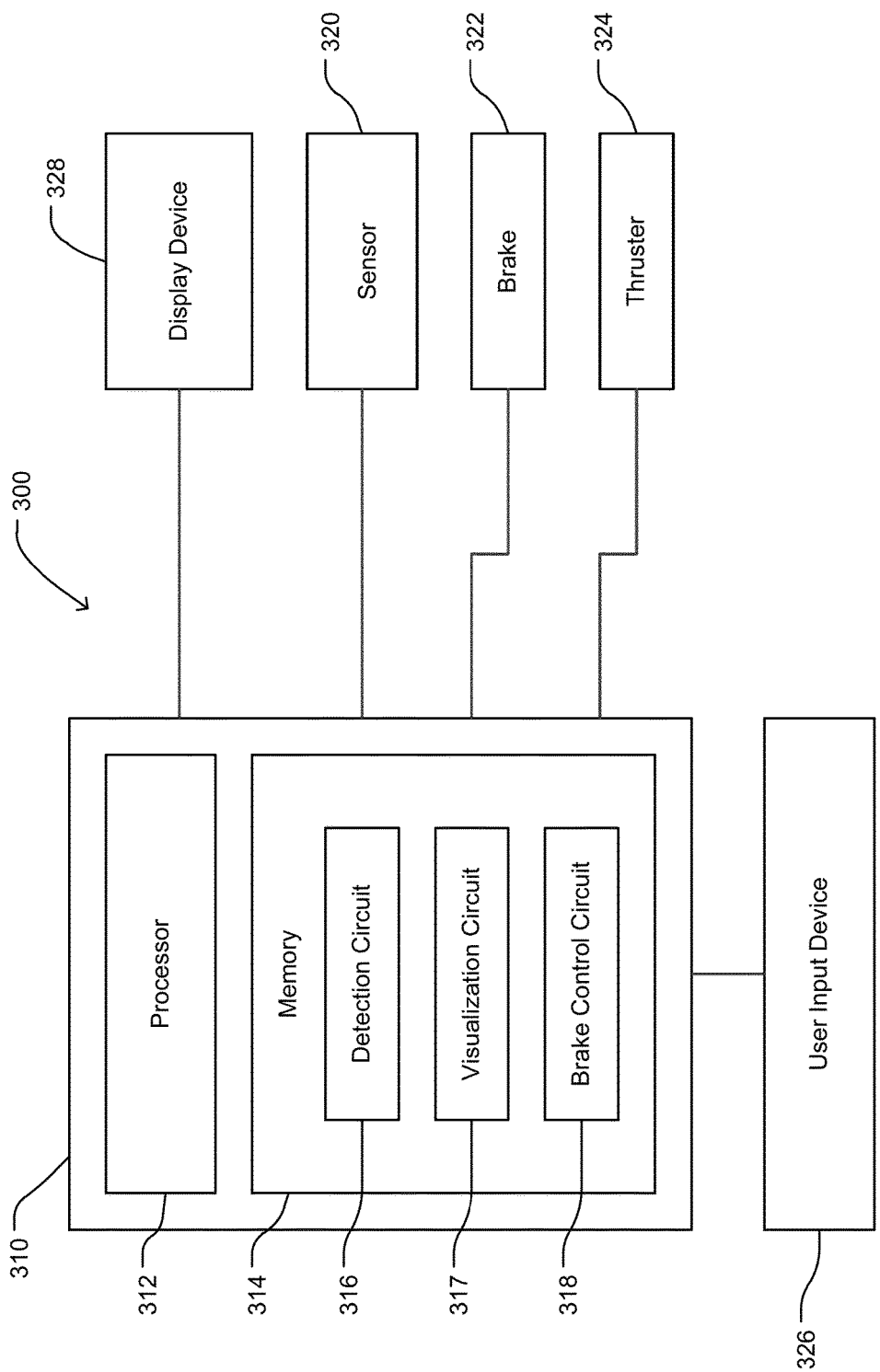
FIG. 4 is a block diagram of an exemplary embodiment of a system configured to operate based on a detected surface condition according to the inventive concepts disclosed herein.

Referring now to FIG. 4, a block diagram of an exemplary embodiment of a system 300 is illustrated in accordance with the inventive concepts described herein. The system 300 includes a processing circuit 310 and a sensor 320. The sensor 320 can be similar to the sensor 60 described with reference to FIG. 1B. The sensor 320 is configured to detect a surface condition (e.g., of a ground surface, of a road, of a runway) and output an indication of the surface condition. In some embodiments, the system 300 includes a display device 328, which can be similar to the flight displays 20 and/or UI elements 22 described with reference to FIG. 1A; the processing circuit 310 can be configured to generate a visualization based on the indication of the surface condition, and the display device 328 can be configured to display the visualization. In some embodiments, the airborne platform includes at least one of a brake 322 and a thruster 324; the processing circuit can be configured to determine an expected braking traction based on the indication of the surface condition and control operation of the at least one of the brake 322 and the thruster 324 based on the indication. The system 300 can be configured to perform the surface condition detection analyses and visualization generation and displaying described with respect to FIGS. 2A-2C and 3A-3B.

In some embodiments, the sensor 320 is or includes an infrared sensor (e.g. a long-wave infrared camera). The sensor 320 can be configured to detect the surface condition as first sensor data of a first wavelength and second sensor data of a second wavelength. The sensor 320 can be configured to output the indication of the surface condition as the first sensor data and the second sensor data, or as a difference between the first sensor data and the second sensor data (e.g., if the sensor 320 includes a processing circuit and/or filter electronics configured to determine a difference between the first sensor data and the second sensor data).

The brake 322 is configured to decrease a speed of the airborne platform. For example, the brake 322 can be coupled to, included in, or integrated with landing gear of the airborne platform, including wheels that are used to travel along a surface (e.g., a ground surface, a landing surface or strip, a runway). The processing circuit 310 can be configured to control operation of the brake 322 (e.g., transmit instructions to the brake 322 that cause the brake 322 to be activated or to be applied to the wheels; transmit instructions indicating a level or magnitude at which the brake 322 is applied; transmit instructions to an avionics system that controls the brake 322 to control operation of the brake 322).

The thruster 324 is also configured to decrease a speed of the airborne platform (e.g., a reverse-thrust mechanism that can be controlled by an operator of the airborne platform from throttle controllers in the cockpit, such as by redirecting exhaust gases from engines of the airborne platform). The airborne platform can include a plurality of thrusters 324 that can be individually controlled. The thruster 324 can be integrated with existing engines of the airborne platform, or can be separately positioned on the airborne platform. The thruster 324 can be oriented to face an opposite direction of a longitudinal axis of the airborne platform or a direction of travel of the airborne platform (e.g., opposite a direction by which engines of the airborne platform cause the airborne platform to move). The processing circuit 310 can be configured to control operation of the thruster 324 (e.g., transmit instructions to the thruster 324 that cause the thruster 324 to be activated; transmit instructions indicating a level or magnitude at which the thruster 324 is applied; transmit instructions to an avionics system that controls the thruster 324 to control operation of the thruster 324).

Referring now to FIG. 4 in further detail, the processing circuit 310 is shown to include a processor 312 and a memory 314. The processor 312 may be implemented as a specific purpose processor, an application specific integrated circuit (ASIC), one or more field programmable gate arrays (FPGAs), a group of processing components, or other suitable electronic processing components. The memory 314 is one or more devices (e.g., RAM, ROM, flash memory, hard disk storage) for storing data and computer code for completing and facilitating the various user or client processes, layers, and modules described in the present disclosure. The memory 314 may be or include volatile memory or non-volatile memory and may include database components, object code components, script components, or any other type of information structure for supporting the various activities and information structures of the inventive concepts disclosed herein. The memory 314 is communicably connected to the processor 312 and includes computer code or instruction modules for executing one or more processes described herein. The memory 314 can various circuits, software engines, and/or modules that cause the processor 312 to execute the systems and methods described herein.

While FIG. 4 shows the processing circuit 310 to include a single processor 312, in various embodiments, the processing circuit 310 can include various numbers or arrangements of processors. For example, the processor 312 can be a multi-core processor. The processor 312 can include a plurality of processors that may be dedicated to different tasks. The processing circuit 310 can include the processor 312 as well as a graphics processing unit (GPU) (not shown); the GPU may be configured to retrieve (or be controlled by the processor 312 to retrieve) electronic instructions for generating a visualization (e.g., visualization 200 described with references to FIGS. 3A-3B) and execute the electronic instructions in order to generate the visualization.

In some embodiments, the memory 314 includes a detection circuit 316. The detection circuit 316 can be configured to receive sensor data from the sensor 320 and process the sensor data, such as for determining a surface condition of a ground surface in a field of view of the sensor 320. The detection circuit 316 can generate an output indication the determined surface condition. The detection circuit 316 can be configured to receive sensor data from the sensor 320 as first sensor data of a first wavelength and second sensor data of a second wavelength, compare the first sensor data to the second sensor data, and identify or detect a surface condition based on the comparison. For example, the detection circuit 316 can determine a difference between the first sensor data and the second sensor data to identify or detect a surface condition. The detection circuit 316 can receive the sensor data as being associated with spatial data (e.g., as an arrangement of pixels, as being associated with coordinate data for reconstructing a spatial map corresponding to the field of view of the sensor 320) and identify or detect a surface condition in different regions indicated by the spatial data.

In some embodiments, the detection circuit 316 is configured to determine a material associated with the surface condition. The material can be at least one of ice, water, snow, frost, or an uncovered road surface material (e.g., asphalt, concrete, or other materials of a road or runway surface). The detection circuit 316 can determine a difference between first sensor data of a first wavelength and second sensor data of a second wavelength, compare the difference to expected differences for different materials, and identify or detect the material based on the comparison. For example, the detection circuit 316 can include a database or lookup table that associates materials with expected difference values or ranges of expected difference values (e.g., in a manner analogous to the association of materials with temperature-emissivity product values shown in Table 1). The detection circuit 316 can perform a lookup in the database based on the determined difference between the first sensor data and the second sensor data to retrieve the associated material.

In some embodiments, the memory 314 include a visualization circuit 317. The visualization circuit 317 can be configured to generate a visualization (e.g., a visualization similar or identical to visualization 200 shown in FIGS. 3A-3B, or display outputs 100a-100c shown in FIGS. 2A-2C) based on the indication of the surface condition received from the sensor 320. In some embodiments, the visualization circuit 317 receives an output from the detection circuit 316 that indicates the surface condition determined by the detection circuit 316, and generates the visualization based on the output from the detection circuit 316.

In some embodiments, the memory 314 includes a brake control circuit 318. The brake control circuit 318 can be configured to determine an expected braking traction for a ground surface based on a surface condition. The brake control circuit 318 can be communicatively coupled to the brake 322 and to the thruster 324. The brake control circuit 318 can be configured to control operation of at least one of the brake 322 or the thruster 324 based on the indication of the surface condition received from the sensor 320. In some embodiments, the brake control circuit 318 receives an output from the detection circuit 316 that indicates the surface condition determined by the detection circuit 316, and controls operation of the at least one of the brake 322 or the thruster 324 based on the output from the detection circuit 316.

In some embodiments, the brake control circuit 318 is configured to control operation of the at least one of the brake 322 or the thruster 324 based on comparing the expected brake traction to one or more threshold braking tractions. The brake control circuit 318 generate and transmit commands to activate the brake 322 or the thruster 324 based on comparing the expected brake traction to one or more threshold braking tractions. For example, a threshold braking traction can be used determine whether to operate the brake 322 or the thruster 324 to decrease a speed of the airborne platform. In conditions with relatively low braking traction (e.g., where the airborne platform might slip on the ground surface), the brake control circuit 318 can prioritize application of the thruster 324 to decrease the speed of the airborne platform, while in conditions with relatively high braking traction (e.g., normal conditions), the brake control circuit 318 can prioritize application of the brake 322 to decrease the speed of the airborne platform; using the brake 322 may be more energy efficient than using the thruster 324 as it may not require fuel to generate a force that causes the airborne platform to decrease in speed.

In some embodiments, the brake control circuit 318 is configured to apply (e.g., cause activation of, control at) the brake 322 at a nominal level (e.g., a level that would be applied if information detected by the sensor 320 were not considered, or independent of a threshold braking traction determined based on sensor data from the sensor 320) or a maximum level if the expected braking traction is greater than or equal to the threshold braking traction, while not applying the thruster 324 (e.g., deliver zero thrust by the thruster 324, apply the thruster 324 at a minimum level). The brake control circuit 318 can apply the thruster 324 at a nominal level or a maximum level if the expected braking traction is less than the threshold braking traction, while not applying the brake 322. In some embodiments, the expected braking traction is determined based on a known traction of the brake 322 (and/or of landing gear or wheels of the airborne platform that can be manipulated by the brake 322).

In some embodiments, the brake control circuit 318 is configured to apply at least one of the brake 322 or the thruster 324 according to a control scheme that depends on two different threshold braking tractions. For example, a first threshold braking traction can be defined that is less than a second threshold braking traction. The brake control circuit 318 can determine a traction difference between the expected braking traction and the first threshold braking traction (or the second threshold braking traction). If the expected braking traction is less than or equal to the first threshold braking traction, then the thruster 324 can be applied at a nominal or maximum level while the brake 322 is not applied; if the expected braking traction is greater than the first threshold braking traction and less than or equal to the second threshold braking traction, then the brake 322 can be applied at a level that increases as a function of the traction difference (e.g., as the traction difference increases relative to the first threshold braking traction, the brake 322 can be applied at an increasing level), while the thruster 324 can be applied at a level that decreases as a function of the of the traction difference (e.g., as the traction difference increases relative to the first threshold braking traction, the thruster 324 can be applied at a decreasing level). If the expected braking traction is greater than the second threshold braking traction, the brake 322 can be applied at a nominal or maximum level, while the thruster 324 is not applied.

The brake control circuit 318 can store the function(s) that define how the brake 322 is applied or controlled as a brake magnitude profile. The brake magnitude profile can define a linear or non-linear relationship describing how the brake 322 can be controlled as a function of the traction difference and/or the threshold braking tractions. The brake control circuit 318 can also store the function(s) that define how the thruster 324 is applied or controlled as a thruster magnitude profile. The thruster magnitude profile can define a linear or non-linear relationship describing how the thruster 324 can be controlled as a function of the traction difference and/or the threshold braking tractions.

In some embodiments, the processing circuit 310 is configured to determine a measure of braking traction on the ground surface based on the indication of the surface condition, and generate the visualization to include a visual representation of braking traction. The brake control circuit 318 can process the indication to determine a material detected by the sensor 320 (e.g., water, ice, frost, asphalt). The brake control circuit 318 can determine a measure of braking traction based on the determined material. For example, the brake control circuit 318 can include or be communicatively coupled to a database mapping materials to braking tractions. The brake control circuit 318 can retrieve a measure of braking traction (e.g., an expected braking traction, a braking efficiency, an expected braking efficiency) based on the determined material. In some embodiments, the braking control circuit 318 can retrieve the measure of braking traction further based on an environmental condition (e.g., a temperature, pressure, or humidity of the environment). The determined material can be associated with a friction parameter or expected friction parameter, and the brake control circuit 318 can determine the braking traction based on the friction parameter.

The visualization circuit 317 can receive the measure of braking traction from the braking control circuit 318, and generate the visualization to include a visual representation of the measure of braking traction. For example, if the measure of braking traction is less than or equal to a threshold braking traction (or if regions of the surface have measure of braking traction less than a threshold braking traction), the corresponding portion of the visualization can be represented in a manner indicative of such a measure of braking traction (e.g., showing the visualization to be blank similar to first portion 234 of FIG. 3B); if the measure of braking traction is greater than the threshold braking traction, the corresponding portion of the visualization can be represented in a manner indicative of such a measure of braking traction (e.g., showing the visualization with markings such as hatches similar to second portion 236 of FIG. 3B).

In some embodiments, the sensor 320 is configured to output the indication of the surface condition such that the indication includes position data associating surface condition values with spatial positions in a field of view of the sensor 320. The visualization circuit 317 can be configured to generate the visualization to include graphical representations of the surface condition values at points in the visualization corresponding to the spatial positions.

In some embodiments, the system 300 includes a user input device 326. The user input device 326 can be similar or identical to the UI elements 22 described with reference to FIG. 1A. The user input device 326 can be configured to receive a user input indicating instructions from a user, and control operation of the system 300 or other components connected to the system 300 based on the user input. The user inputs may indicate instructions for controlling how visualizations are displayed by the display device 328 (e.g., toggling on/off brake effectiveness 230 or runway surface condition indicators 240).

Figure 5:
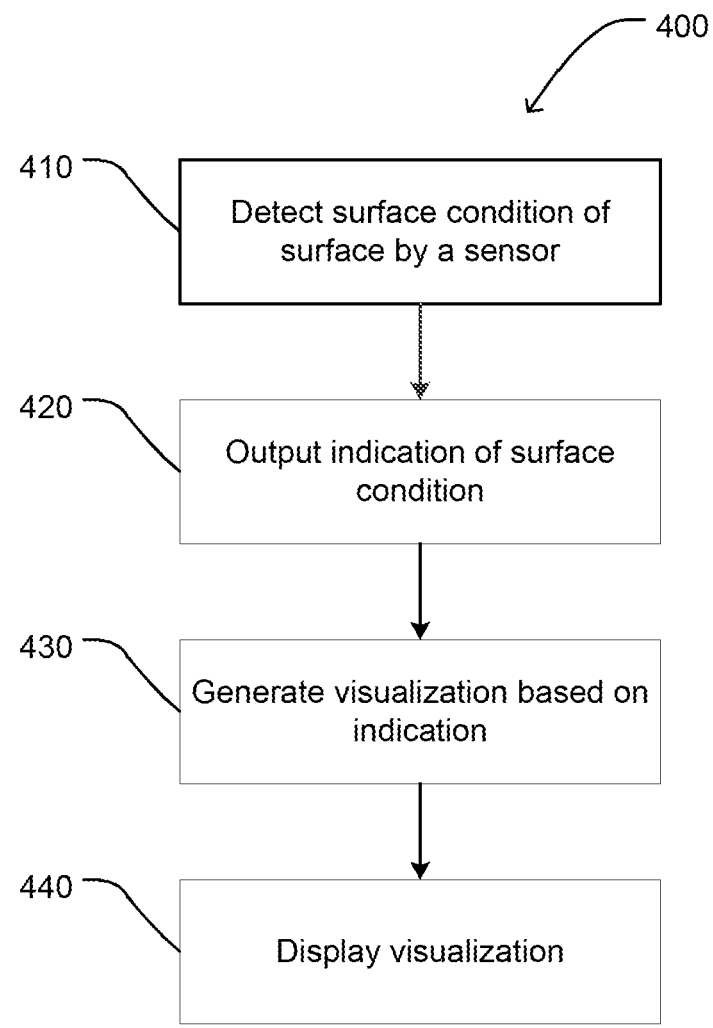
FIG. 5 is a diagram of an exemplary embodiment of a method of generating a visualization of a surface condition according to the inventive concepts disclosed herein.

Referring now to FIG. 5, an exemplary embodiment of a method 400 according to the inventive concepts disclosed herein may include the following steps. The method 400 may be performed using various hardware, apparatuses, and systems disclosed herein, such as the aircraft control center 10, the system 300, and/or components thereof.

A step (410) may include detecting a surface condition of a ground surface by a sensor. For example, a long-wave infrared sensor may be used to detect sensor data at two different wavelengths. The sensor may detect the sensor data as a temperature-emissivity product at each wavelength.

A step (420) may include outputting an indication of the surface condition. For example, the sensor may output a measure or value of the temperature-emissivity product for each wavelength. In some embodiments, the sensor outputs the indication of the surface condition along with a plurality of spatial positions associated with surface conditions, such as to provide image data that can be used to reconstruct an image of a field of view of light detected by the sensor.

A step (430) may include generating a visualization based on the indication. For example, the visualization may associate graphical elements (e.g., colors, shapes) with values of the surface condition or values of the temperature-emissivity product. The visualization may be generated so that the graphical elements can be displayed.

A step (440) may include displaying the visualization. If the values of the surface condition or temperature-emissivity product are associated with spatial positions, the visualization can include or be overlaid on an image of the surface (e.g., an image of a runway) or a window through which the surface can be viewed. The visualization can be displayed by or as part of an EVS, a HUD, an HGS, or a head-down display.

Figure 6:
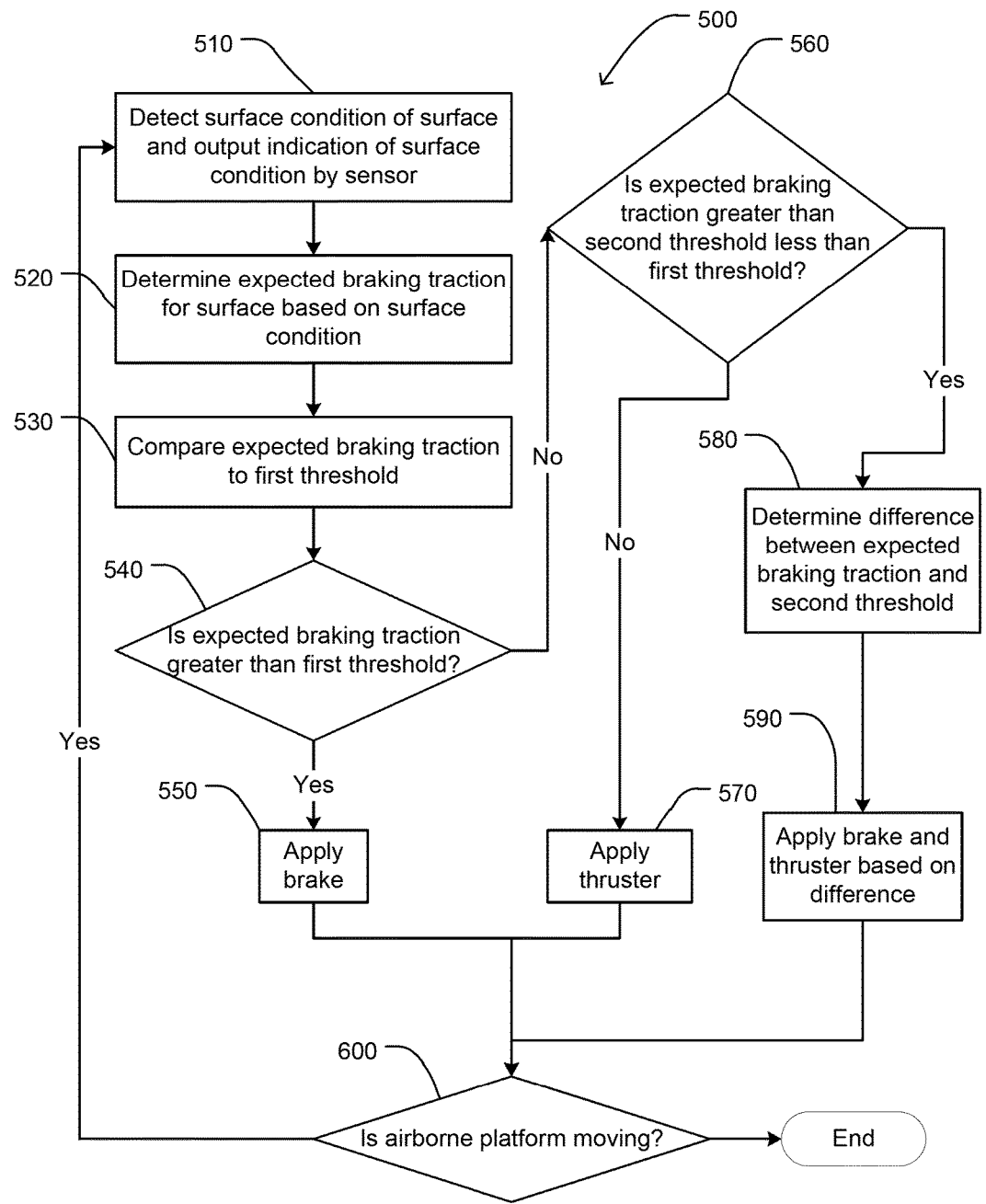
FIG. 6 is a diagram of an exemplary embodiment of a method of controlling operation of an airborne platform based on a surface condition according to the inventive concepts disclosed herein.

Referring now to FIG. 6, an exemplary embodiment of a method 500 according to the inventive concepts disclosed herein may include the following steps. The method 500 may be performed using various hardware, apparatuses, and systems disclosed herein, such as the aircraft control center 10, the system 300, and/or components thereof.

A step (510) may include detecting a surface condition of a ground surface by a sensor and outputting an indication of the surface condition. For example, a long-wave infrared sensor may be used to detect sensor data at two different wavelengths. The sensor may detect the sensor data as a temperature-emissivity product at each wavelength. The sensor may output a measure or value of the temperature-emissivity product for each wavelength. In some embodiments, the sensor outputs the indication of the surface condition along with a plurality of spatial positions associated with surface conditions, such as to provide image data that can be used to reconstruct an image of a field of view of light detected by the sensor.

A step (520) may include determining an expected braking traction for the surface based on the surface condition. For example, the surface condition may indicate (or be determined to indicate) a particular material on the surface, which may be associated with an expected braking traction, such as based on a coefficient of friction for the material.

A step (530) may include comparing the expected braking traction to a first threshold. The first threshold may correspond to a braking traction below which an airborne platform might slip if the brake is applied at a nominal or maximum level.

A step (540) may include determining if the expected braking traction is greater than the first threshold. If the expected braking traction is greater than the first threshold, then a step (550) may including applying the brake, such as applying the brake at a nominal or maximum level.

If the expected braking traction is less than or equal to the first threshold, then a step (560) may include determining whether the expected braking traction is greater than a second threshold which is less than the first threshold. If the expected braking traction is less than the second threshold, than a step (570) may include applying a thruster. For example, the second threshold may correspond to a threshold below which applying the brake may be relatively certain or highly certain of causing slipping or other unsafe operation of the airborne platform.

If the expected braking traction is greater than the second threshold, then a step (580) may include determining a difference between the expected braking traction and the second threshold. A step (590) may include applying the brake and applying the thruster (e.g., applying simultaneously; applying in an alternating sequence) based on the difference. For example, the brake may be applied based on a brake magnitude profile that increases as the difference increases (e.g., as the likelihood of slipping decreases) while the thruster may be applied based on a thruster magnitude profile that decreases as the difference increases.

In some embodiments, a step (600) may include determining whether the airborne platform is still moving. If the airborne platform is still moving, the surface condition may again be detected (510) to determine whether additional brake or thruster action is required to bring the airborne platform to a stop.

In some embodiments, a measure of braking traction on the surface can be determined based on the indication of the surface condition. The visualization can be generated to include a visual representation of the measure of braking traction. For example, the visualization can include regions indicating where braking traction is sufficient or insufficient to perform a braking maneuver (e.g., as compared to a threshold braking traction).

In some embodiments, the inventive concepts disclosed herein may be applied to takeoff conditions, such as for determining a safe rejected-takeoff stopping distance. For example, runway surface conditions can be determined and displayed while the airborne platform is taxiing or accelerating for takeoff.

In some embodiments, the inventive concepts disclosed herein may be applied to a ground-based vehicle (e.g., an automobile). For example, road or ground surface conditions can be determined, and used by a braking system (e.g., and anti-lock braking system) to tune a braking output based on detected surface conditions.

As will be appreciated from the above, systems and methods for controlling operation of an airborne platform based on surface conditions according to embodiments of the inventive concepts disclosed herein may improve operation of airborne platforms by showing an operator of the airborne platform where regions on a surface may have low braking traction, and/or controlling operation of a brake or a thruster based on the surface conditions.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a sensor configured to be located on an exterior of a vehicle, the sensor configured to detect a surface condition of a surface based on light detected by the sensor and output an indication of the surface condition, the indication including position data associating surface condition values with spatial positions in a field of view of the sensor, each spatial position defined relative to a position of the vehicle;
   a processing circuit configured to:
      receive the indication from the sensor;
      determine a measure of braking traction on the surface at each spatial position for each surface condition value based on an expected traction of a material associated with the surface condition value;
      compare the measure of braking traction at each spatial position to a threshold traction; and
      generate a visualization based on the indication, the visualization mapping, to each spatial position relative to the position of the vehicle, a braking traction indication based on each respective comparison, the braking traction indication including a first visual indication based on the measure of braking traction being greater than the braking traction threshold, the braking traction indication including a second visual indication different than the first visual indication based on the measure of braking traction being less than the braking traction threshold; and
   a display device configured to display the visualization.

2. The system of claim 1, wherein the sensor comprises a long-wave infrared camera configured to detect the surface condition as first sensor data of a first wavelength and second sensor data of a second wavelength.

3. The system of claim 2, wherein the sensor is further configured to output the indication as a difference between the first sensor data and the second sensor data.

4. The system of claim 2, wherein:
   the sensor is further configured to output the indication as the first sensor data and the second sensor data; and
   the processing circuit is further configured to:
      determine a difference between the first sensor data and the second sensor data; and
      generate the visualization further based on the difference between the first sensor data and the second sensor data.

5. The system of claim 1, wherein:
the visualization is a first visualization; and
the processing circuit is configured to generate a second visualization to include graphical representations of the surface condition values at points in the second visualization corresponding to the spatial positions.

6. The system of claim 1, wherein the display device is a heads-up display.

7. The system of claim 1, wherein the processing circuit is further configured to determine a material associated with the surface condition, the material being at least one of ice, water, snow, frost, or asphalt.

8. A system, comprising:
a sensor configured to be located on an exterior of an airborne platform, the sensor configured to detect a surface condition of a surface and output an indication of the surface condition; and
a processing circuit configured to:
receive the indication from the sensor;
determine an expected braking traction for the surface based on the surface condition;
compare the expected braking traction to a first threshold braking traction;
transmit a command to activate the brake responsive to the expected braking traction being greater than the first threshold braking traction; and
responsive to the expected braking traction not being greater than the first threshold braking traction: (i) compare the expected braking traction to a second threshold braking traction less than the first threshold braking traction, (ii) responsive to the expected braking traction being less than the second threshold braking traction, activate a reverse thruster of the airborne platform and not activate the brake, and (iii) responsive to the expected braking traction being greater than the second threshold braking traction, determine a difference between the expected braking traction and the second threshold braking traction, activate the brake according to a brake magnitude profile that increases as the difference increases, and activate the reverse thruster according to a thruster magnitude profile that decreases as the difference increases.

9. The system of claim 8, wherein the surface condition is determined based on a material associated with the surface condition, the material being at least one of ice, snow, water, or asphalt.

10. The system of claim 8, wherein the sensor comprises a long-wave infrared camera configured to detect the surface condition as first infrared data of a first wavelength and second infrared data of a second wavelength.

11. The system of claim 8, wherein:
the indication includes position data associating surface condition values with spatial positions in a field of view of the sensor; and
the processing circuit is configured to generate a map of expected braking traction based on surface condition values at points in the map corresponding to the spatial positions.

12. The system of claim 11, further comprising a display device, wherein the processing circuit is further configured to generate a visualization of the map and the display device is configured to display the visualization.

13. The system of claim 8, further comprising an enhanced vision system configured to display an overlay of flight data on an image of an environment surrounding the airborne platform, wherein the enhanced vision system comprises the sensor.

14. A method, comprising:
detecting a surface condition of a ground surface by a sensor using light detected by the sensor;
outputting an indication of the surface condition, the indication including position data associating surface condition values with spatial positions in a field of view of the sensor, each spatial position defined relative to a position of the vehicle;
determining a measure of braking traction on the surface at each spatial position for each surface condition value based on an expected traction of a material associated with the surface condition value;
comparing the measure of braking traction at each spatial position to a threshold traction;
generating a visualization based on the indication, the visualization mapping, to each spatial position relative to the position of the vehicle, a braking traction indication based on each respective comparison, the braking traction indication including a first visual indication based on the measure of braking traction being greater than the braking traction threshold, the braking traction indication including a second visual indication different than the first visual indication based on the measure of braking traction being less than the braking traction threshold; and
displaying the visualization.

15. The method of claim 14, wherein the indication comprises first infrared data of a first wavelength and second infrared data of a second wavelength.

16. The method of claim 15, further comprising:
determining a difference between the first infrared data and the second infrared data; and
generating the visualization based on the difference.

* * * * *